Jan. 15, 1952   W. S. AUSHERMAN   2,582,307
REPAIR UNIT FOR BROKEN VEHICLE AXLES
Filed Oct. 27, 1949
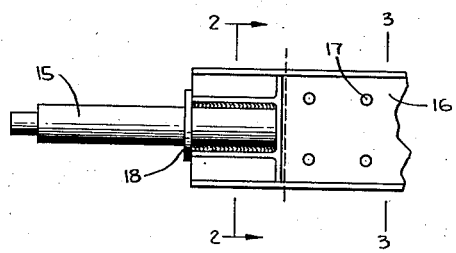
Fig. 1
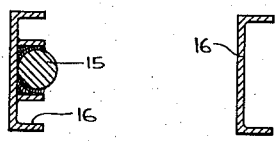
Fig. 2
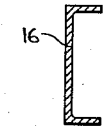
Fig. 3
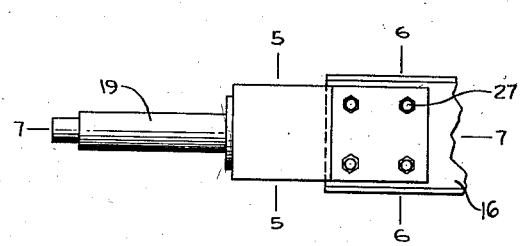
Fig. 4
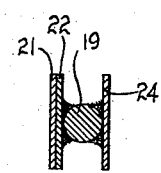
Fig. 5
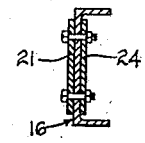
Fig. 6
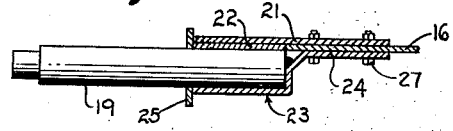
Fig. 7
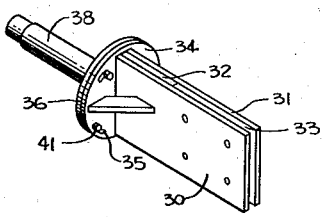
Fig. 9
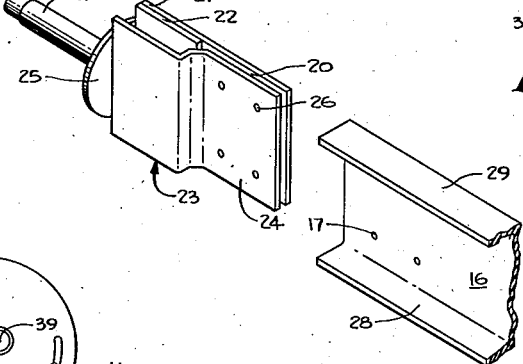
Fig. 8
Fig. 10
WILLIAM S. AUSHERMAN
Inventor
By Hubert Miller
Attorney Patented Jan. 15, 1952

2,582,307

UNITED STATES PATENT OFFICE 2,582,307

REPAIR UNIT FOR BROKEN VEHICLE AXLES

William S. Ausherman, Wichita, Kans.

Application October 27, 1949, Serial No. 123,934

4 Claims. (Cl. 301—130)

This invention relates to a unit for repairing the broken axles of heavy vehicles, such as grain combines and other agricultural machines.

The primary object of the invention is to provide a repair unit which can be applied to the vehicle while it is in the field, and without the necessity of removing the entire axle from the vehicle.

Another object is to provide a unit which accomplishes a permanent repair of the broken axle, because it has even greater strength than the original unbroken axle.

The invention, together with other objects attending its production, will be more clearly understood when the following description is read in connection with the accompanying drawings, in which:

Fig. 1 is a fragmentary side view of a conventional axle used on heavy farm machines;

Figs. 2 and 3 are sectional views taken along the lines 2—2 and 3—3, respectively, of Fig. 1;

Fig. 4 is a side view of one type of axle repair unit embodying my invention, the unit being shown attached to a portion of a conventional axle;

Figs. 5 and 6 are vertical sections taken along the lines 5—5 and 6—6, respectively, of Fig. 4;

Fig. 7 is a horizontal sectional view taken along the line 7—7 of Fig. 4;

Fig. 8 is a perspective view of that embodiment of the invention shown in Figs. 4 to 7, and of a portion of a conventional axle, and illustrates their relative positions just prior to assembly;

Fig. 9 is a perspective view of another type of axle repair unit embodying the invention; and Fig. 10 is an end view of the repair unit illustrated in Fig. 9.

Referring to the drawings, a conventional axle construction for heavy farm machines such as combines includes a pair of alined stub axles 15, and an intermediate structural steel girder 16, the stub axles being carried integrally by the ends of the girder, or being rigidly secured to the opposite ends thereof by welding. Bolt holes 17 facilitate attachment of the chassis or body of the machine to the load bearing girder.

The normal point of breakage of the axle is indicated by the arrow 18. When such breakage occurs the machine is usually rendered useless until a new one piece replacement axle can be ordered and shipped to the operator. It is then necessary for him to remove the old axle as a unit, and replace it with the new one, the procedure requiring much time and work.

Instead of such procedure, a repair unit such as contemplated by my invention can be used.

The unit shown in Figs. 4 to 8 inclusive includes a stub axle 19 having one end rigidly welded into one end of a rigid body made up of structural steel plates, the arrangement and spacing of the plates forming a socket 20 at the other end of the rigid body. The plate 21 is an outer plate and forms one wall of the mentioned socket. The short plate 22 is a spacer plate, and one of its edges serves as a stop to properly position the repair unit on the broken axle. Plate 22 is welded flat against plate 21 near one of its ends, as shown in Figs. 7 and 8, and is also welded with an extra heavy weld to stub axle 19. A third plate 23 is bent to the form shown in Fig. 8, and one of its ends is welded with a similar heavy weld to the opposite side of the stub axle 19, in a position substantially parallel to the plate 22. The opposite end 24 of the plate 23 lies parallel to the plate 21, and forms the other wall of the mentioned girder receiving socket. A hub guard 25, normally affixed to the stub axle is welded firmly to the adjacent ends of the plates 21, 22, and 23, and the rigid unitary axle repair unit is complete. Matching bolt holes 26 are provided in the socket forming ends of the plates 21 and 23. These bolt holes are spaced to match the bolt holes 17 normally provided in each end of the girder 16 near the stub axles 15.

As will be easily understood, the repair of a broken axle with the repair unit described involves cutting off a portion of the end of the girder 16, as indicated by the broken line in Fig. 1. The repair unit is then slipped onto the cut end of the girder, the girder web being complementally received in the socket 20. Bolts 27 are then passed through the matching bolt holes 26 and 17 in the plates 21 and 23 and in the girder, respectively. Nuts are tightened on the bolts and the repair is complete.

It will be noted that the plate 23 is of such width as to slide snugly between the upper and lower girder flanges, 28 and 29. Thus the flanges aid the bolts 27 in absorbing and distributing bending moments created by ground shocks, etc. It should also be noted that the described repair unit will fit most any girder unit of conventional cross section, whether it be a channel section, I-beam section, or rectangular section. The relative fore and aft position of the repair unit axle with relation to the machine as a whole may be varied by simply changing the relative positions of the socket 20 and the axle 19, as will be easily understood by anyone familiar with this art.

A second embodiment of the invention is illustrated in Figs. 9 and 10. This embodiment accomplishes two additional results not accomplished by the previously described embodiment, namely, it provides for fore and aft adjustment of the repair unit axle after the unit has been attached to the girder, and it permits subsequent replacement of a broken repair unit axle without the necessity of replacing the entire repair unit.

It consists of a rigid body formed from flat plates 30 and 31 spaced apart the approximate thickness of the girder web by means of a spacer plate 32, all three of these plates being welded together in the positions shown to form a girder receiving socket 33, in one end of the rigid body. A plate 34 is then welded transversely to the assembled ends of the plates 30, 31, and 32, and a gusset brace is welded to the plates 30 and 34, in the position shown. The plate 34 is provided with a plurality of circumferentially spaced arcuate slots 35 having a common center. A second plate 36 is provided with an identical number of identically spaced matching slots 37. A stub axle 38 has its inner end firmly welded to one surface of the plate 36, the axis 39 of the axle being eccentric to the radial center 40 of the slots 37, as clearly shown in Fig. 10. The two parts of the repair unit are assembled as shown in Fig. 9, and are held assembled by means of bolts 41 passing through the matching arcuate slots 35 and 37.

This last described unit is attached to a cut off girder in the same manner as described for unit illustrated in Fig 8. If a fore or aft adjustment of the stub axle 38 is desired after the repair unit has been installed on the machine, it is only necessary to jack up the machine, loosen the nuts on the bolts 41, rotate the outer disc 36 until the stub axle is in the desired position, then retighten the nuts on bolts 41.

Should the repair unit axle 38 be subsequently broken it can be easily replaced by a new stub axle welded to the plate 36, which plate can, of course, be removed from the machine to facilitate the welding operation.

Having described two preferred embodiments of the invention with sufficient clarity to enable those familiar with the art to construct and practice the invention, I claim:

1. In a vehicle of the class having a one piece axle made up of spaced alined stub axles and an integral intermediate structural steel girder, a repair unit for a broken one of said stub axles comprising: a rigid body having a socket in one of its ends for complementally receiving at least a portion of the end of said girder after that portion bearing the broken axle has been cut off; means for rigidly securing the said body to the received portion of said girder; a flat plate rigidly secured to the opposite end of said body in a plane transverse to the longitudinal axis of the vehicle axle; a second plate adapted to be secured flat against the outer surface of the first mentioned plate; concentric matching arcuate through slots in both said plates; a new stub axle carried rigidly by said second plate, the axis of said axle being eccentric with relation to the radial center of said slots; and bolts passing through the matching slots in both plates for rigidly but adjustably securing them together.

2. In a vehicle of the class having a one piece axle made up of spaced alined stub axles and an integral intermediate structural steel girder which includes a relatively thin web disposed in a normally vertical plane, a replacement unit for a broken one of said stub axles comprising: a pair of juxtaposed plates spaced apart at adjacent ends to form an open socket adapted to snugly receive an end of the web of said girder after that portion bearing the broken axle has been cut off; means for rigidly securing those portions of said plates which form the socket to the received web of the girder; and a new stub axle rigidly affixed to the opposite adjacent ends of said plates.

3. The invention described in claim 2, and a third plate between the first two mentioned plates and rigidly secured to at least one of them, and adapted to contact the received end of the web of said girder and to limit its penetration into said socket.

4. In a vehicle of the class having a one piece axle made up of spaced alined stub axles and an integral intermediate structural steel girder which includes a relatively thin web disposed in a normally vertical plane, a replacement unit for a broken one of said stub axles comprising: a pair of juxtaposed plates spaced apart at adjacent ends to form an open socket adapted to snugly receive an end of the web of said girder after that portion bearing the broken axle has been cut off; matching bolt holes in those portions of said plates which form the socket, and in the received end of said web; bolts passing through said holes and connecting the three together rigidly; and a new stub axle rigidly affixed to the opposite adjacent ends of said plates.

WILLIAM S. AUSHERMAN.

REFERENCES CITED

The following references are of record in the file of this patent:

UNITED STATES PATENTS

| Number | Name | Date |
|---|---|---|
| 523,506 | Barnes | July 24, 1894 |
| 1,183,927 | Watts | May 23, 1916 |